Figure 1:
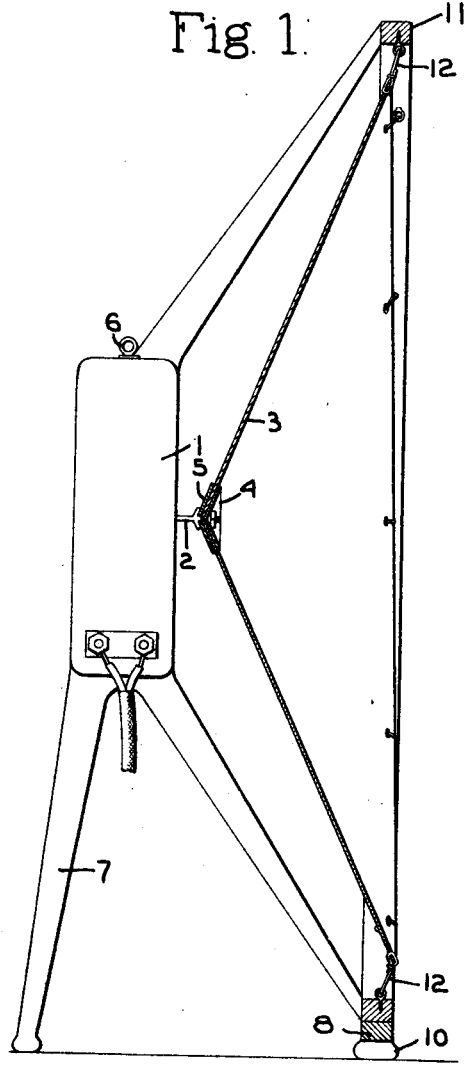

Oct. 29, 1929.  S. J. PLIMPTON  1,733,751
METHOD AND APPARATUS FOR TRANSLATING SOUND
Filed Nov. 25, 1927

Inventor.
Samuel J. Plimpton
by Heard Smith Dennant
Attys

Patented Oct. 29, 1929

1,733,751

UNITED STATES PATENT OFFICE

SAMUEL J. PLIMPTON, OF WORCESTER, MASSACHUSETTS, ASSIGNOR OF ONE-HALF TO ROBERT BRUCE STURRUP, OF WORCESTER, MASSACHUSETTS, AND ONE-HALF TO EDWARD W. HANNA, OF LEICESTER, MASSACHUSETTS

METHOD AND APPARATUS FOR TRANSLATING SOUND

Application filed November 25, 1927. Serial No. 235,347.

This invention relates to improvements in methods and apparatus for translating sound by impressing vibratory movement upon a region of an elastic vibratile structure having relatively greater area than said region, and the object of the invention is to reduce the resonance caused by the characteristic frequency of vibration of the elastic vibratile structure when subjected to vibratory movement, and thereby eliminate distortion of the sound transmitted thereby.

It is well known that when a vibratory motion is applied to a region of an elastic vibratory structure, such as a disk, cone, or panel, the motion in general will be transmitted to the boundaries and there reflected back into the region upon which such vibrations are impressed. In all such cases there exists frequencies of vibration such that when the impressed vibration contains one or more of these frequencies there are waves returning from the boundaries which are in step with those advancing from the region upon which the vibrations are impressed in such a way as to produce so-called "standing waves" or "resonance vibrations."

Any such structure when used in a sound translating device, such as a loud speaker, behaves selectively with regard to these characteristic frequencies with a consequent distortion of the sound or music which is being transmitted.

When a wave is produced at the region to which the vibratory movement is applied, it travels to the boundary of the structure, that is to a region where the elastic constant of the medium changes somewhat suddenly, and is there reflected. The reflected wave starts back toward the region upon which it is impressed in a change of phase which depends upon the character of the boundary. If the boundary is absolutely rigid the change of phase will be zero and the reflected wave will return in a phase with the impressed wave. If the boundary is perfectly free there will be a reversal or "phase shift" of the reflected wave relatively to the impressed wave.

I have discovered that the "phase shift" of portions of the vibratory waves reflected from the boundaries of an elastic vibratile structure may be utilized to neutralize the effects of the reflected waves upon the region to which the vibratory movement is applied so that the region to which the vibratory movement is applied will be a nodal point with respect to the reflected waves, thereby substantially eliminating the effect of standing waves and substantially preventing the reaction of the reflected waves upon the region to which vibratory movement is applied. I have discovered that this method is applicable to all wave lengths whenever the arrangements at the boundaries of the elastic vibratile structure are such that it applies to any one wave length.

By reason of the present invention, therefore, interference with the vibrations transmitted to the vibratile structure is unimpaired, resonance due to the characteristic frequencies of vibration of such structure are substantially eliminated, and the sound transmitted by the vibration of the elastic vibratile structure corresponds substantially perfectly to the sound vibrations impressed upon it.

More particularly the present method comprises translating sound by impressing vibratory movement upon a region of an elastic vibratile structure of relatively greater area than said region and restraining the vibration of predetermined regions of the boundaries of said elastic structure in such a manner as to vary the phases of portions of the vibratory waves reflected from the restrained regions relatively to the phases of the waves therebetween in such a manner as substantially to neutralize the effects of the reflected waves upon the region to which the vibratory movement is applied.

Desirably the restraint upon the predetermined regions of the boundaries is imposed by a movable force or forces acting upon said regions of the boundaries in directions opposite to the displacement thereof caused by the waves imparted to the structure by said vibrating movement, but it will also be understood that the restraint may be imposed upon said regions by a substantially immovable force.

The invention also comprises the method of translating sound by impressing vibratory movement upon the outer face of the central region of an elastic vibratile structure of relatively greater area than said region which presents a concave or re-entrant sound-projecting face by restraining vibration of predetermined regions of the boundaries of said elastic structure in such a manner as to vary the phases of portions of the vibratory waves reflected from the restrained regions relatively to the phases of waves therebetween sufficiently to substantially neutralize the effects of the reflected waves upon the region to which the vibratory movement is applied. In usual sound translating devices, such as loud speakers, the vibrations are transmitted from the convex surface of a cone or concavo convex disk the boundary of which is either free or is restrained throughout. In either case standing sound waves are developed which interfere with the proper reproduction or translation of the music or other sound. By the method embodying the present invention such undesirable waves are avoided and interference with the proper impression of vibratory movement upon the elastic structure is eliminated. Furthermore, by reason of this invention the advantages of the more effective transmission of the sound from a re-entrant face are obtained as the column of air which lies in front of the re-entrant face, whether of conical form or of concave form, is confined to a greater or less degree in accordance with the conicity or concavity of the surface presented by the vibratory structure and such partial confinement of the column of air increases the effectiveness of the sound transmission, both as to strength and quality, very greatly relatively to that transmitted from the usual flat or convex surfaces employed in loud speakers and the like.

Furthermore, by reason of the present method the resonance of the elastic vibratile structure is substantially eliminated and, therefore, the sounds transmitted are not subject to such resonance as is produced by the usual horn type of loud speakers in which vibration is imparted to the column of air within the horn from a relatively small vibratile diaphragm.

By proper application of restraint to predetermined regions of the boundaries, which may be determined by experimentation or by a somewhat complex mathematical calculation which need not be herein described, the phase of different portions of the reflected waves may be relatively varied or shifted in such a manner as to produce a nodal point of the reflected waves at the region upon which the vibrations are impressed, thereby substantially eliminating the effect of the characteristic sounding waves or resonance of the structure.

The method above described may be employed to translate sound from various types of elastic vibratile structure, such as cones, disks, or panels. Desirably a vibratile structure in the form of a cone is employed as it can be constructed of material having relatively small mass and greater rigidity than other types of elastic vibratile structures. The method herein described will, therefore, be more fully described in its application to a conical sound translating device such as the cone type of loud speaker employed in radio receiving apparatus.

Figure 2:
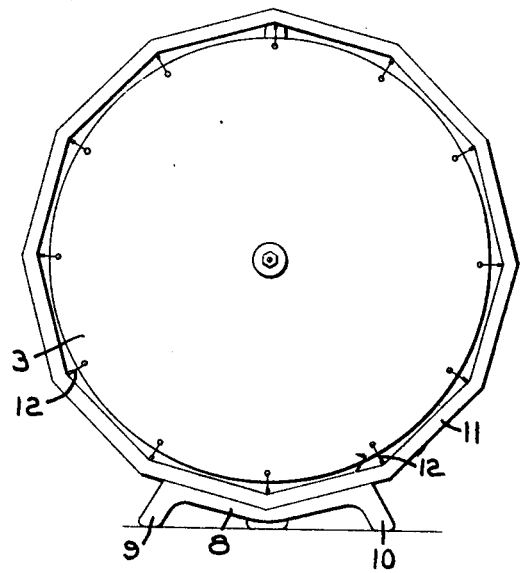

An illustrative embodiment of the invention is shown in the accompanying drawings, in which, Fig. 1 is a vertical central sectional view through a preferred type of conical loud speaker;

Fig. 2 is a front elevation of the same on a somewhat reduced scale.

The apparatus illustrated comprises a casing 1, which may be of rectangular or other form, to enclose the usual electrical mechanism by means of which a rod or plunger 2 is vibrated which in turn imparts vibration to the elastic vibratile structure, such as a cone 3, made of suitable light material of an elastic, but substantially non-resilient character, such as blotting paper or preferably a sheet product known commercially as "leatherette". The rod or plunger 2 desirably is connected to the apex of the cone by relatively rigid clamping members 4 and 5 of thin light metal such as aluminum.

The casing 1 may be supported in any suitable manner, as for example by screws extending through the back thereof into a wall, or suspended by a cord secured to a suitable eye 6 anchored in the casing, but preferably is supported by an easel construction comprising a rear leg 7 and a bracket 8 having legs 9 and 10 to co-operate with the leg 7 and which bracket is secured to a rigid frame 11 which surrounds the boundaries of the cone. The frame illustrated herein is of regular polygonal form presenting twelve sides, but it will be understood that the number of sides of the polygon, or the form of the supporting frame may be varied as may be required by the number of points of restraint required, or that the frame may be of circular or other form complementary to the form of the vibratory sound translating structure employed.

The particular form of frame is illustrated herein as indicating a desirable structure which will present a maximum and uniform strength as anchorages for the restraining members 12 which desirably are secured at the junctions of the sides and extend radially therefrom to their points of attachment to separated regions of the boundaries of the cone.

The restraining members 12 desirably are inextensible flexible cords which are suitably secured at predetermined intervals to the boundaries of the cone and, as before stated, are anchored to the frame 11. These flexible restraining members extend substantially radially with respect to the axis of the cone and are adapted to permit the slight bodily vibration of the cone in the direction of its axis in response to the vibrations imparted to it through the rod or plunger 2, but the inextensible quality of the tension members offers a movable force acting in opposition to the vibration of the boundaries of the cone caused by the vibratory waves radiating from the center of the cone and reflected back from the edges thereof so that the regions of restraint of the boundaries of the cone are in effect substantially rigid relatively to the regions intermediate of the restrained regions so that by properly spacing the restrained regions of the boundaries the phase shift of the reflected waves returning from the restrained and relatively free regions of the boundaries will have a nodal point at the apex of the cone, thereby neutralizing the effect of the characteristic standing waves of the cone upon the mechanism through which vibration is imparted to the cone. Furthermore, the substantial neutralization of the standing waves permits the vibration of the cone in true consonance with the vibrations imparted to it through the actuating rod or plunger 2 and consequently translates such vibrations into sounds which are substantially pure and unaffected by such undesirable vibrations as are inherently produced in vibrating cones, or other structures, in which the edge is either wholly free or wholly restrained or improperly partially restrained.

It may be noted that the elastic inextensible restraining members 12, which are illustrated at the upper and lower boundaries of the cone 3 in Fig. 1, appear to extend in an angular direction relatively to the plane of the boundary of the cone. Such illustration, of course, is greatly exaggerated and the members are shown in this position merely to illustrate the suspension of the cone which is mainly supported from its top with its center of gravity to the left of the plane of the boundary of the cone which naturally causes the lower portion of the cone to swing to the right and the upper portion to the left. The action, however, of these restraining cords upon the boundaries of the cone is substantially radial of the axis of the cone and the movement of the boundary of the cone caused by the impressed vibratory waves and the reflected waves is resisted by the resultant of the tension imposed upon such restraining member which acts in a direction opposite to the direction of movement imparted to the boundary by such waves.

When vibratory movement is imparted to the cone at its apex by the vibratory mechanism of a radio receiving set, or by other vibratory means, the vibrations are imparted to the apex region of the cone and the cone vibrating in consonance therewith transmits the vibration directly to the column of air in front of the concave face of the cone. The vibratory waves which radiate from the apex region of the cone to the boundaries thereof are reflected from the boundaries, but by reason of the restraint of predetermined regions of the boundaries the "phase shift" of alternating portions of the reflected waves produces a nodal point of the reflected waves at the apex of the cone and neutralizes the effect of standing waves upon the vibration of the cone and eliminates interference of the standing waves with the action of the mechanism which imparts vibratory movement to the apex region of the cone.

I have demonstrated by practical construction that the method of transmitting sound herein described is vastly superior to other methods because of the elimination of standing waves and the avoidance of interference by undesirable reflected vibrations with the vibratory movement which is imparted to the sound transmitting structure.

Where a relatively large cone is employed having the effective diameter of approximately one-fourth of the longest wave length to be transmitted, a substantially perfect reproduction of music is transmitted therefrom.

It will be understood that the mechanism illustrated and described herein for the performance of the method of transmitting sound herein described is of an illustrative character and is not restrictive and that such other types of apparatus, including those heretofore mentioned, may be employed in the performance of the method within the spirit and scope of the following claims.

Having thus described the invention, what is claimed as new, and desired to be secured by Letters Patent, is:

1. The method of translating sound by impressing vibratory movement upon a region of an elastic vibratile structure of relatively greater area than said region and causing a phase shift of portions of the vibratory waves reflected from the boundaries of said structure to neutralize the effects of reflected waves upon the region to which said vibratory movement is applied.

2. The method of translating sound by impressing vibratory movement upon a region of an elastic structure of relatively great area, and causing alternating portions of waves reflected from the boundaries of said structure to vary in phase in such manner as substantially to neutralize the effects of the reflected waves upon the region to which said vibratory movement is applied.

3. The method of translating sound by impressing vibratory movement upon a region of an elastic structure of relatively great area, and restraining the vibration of predetermined regions of the boundaries of said elastic structure in such manner as to vary the phases of portions of the vibratory waves reflected from the restrained regions relatively to the phases of said waves therebetween sufficiently to substantially neutralize the effects of the reflected waves upon the region to which said vibratory movement is applied.

4. The method of translating sound by impressing vibratory movement upon a region of an elastic vibratile structure of relatively greater area than said region and effectively restraining the vibrations of predetermined regions of the boundaries relatively to those of intermediate regions thereof by movable forces acting upon said boundaries in directions opposite to the displacement thereof caused by the waves imparted to said structure by said vibratory movement.

5. The method of translating sound by impressing vibratory movement upon the convex central region of an elastic structure of relatively greater area than said region and which presents a re-entrant sound-projecting face and restraining the vibration of predetermined regions of said elastic structure in such a manner as to vary the phases of portions of the vibratory waves reflected from the restrained regions relatively to the phase of the waves therebetween sufficiently to substantially neutralize the effects of the reflected waves upon the central region to which the vibratory movement is applied and thereby enable the elastic structure to impart vibrations to the partially confined column of air in contact with the re-entrant face thereof unaffected by standing waves or resonance characteristic of the vibratile structure.

6. A device for translating sound comprising a vibratile conical structure having a diameter approximating one-fourth of the length of the maximum wave to be transmitted, means for imparting vibratory movement to a relatively small region of the apex of said cone, a rigid support for the boundaries of said cone and means anchoring regions of said boundaries to said support at predetermined intervals to provide relatively free portions of said boundaries therebetween operable to cause a phase shift of portions of the waves reflected from said boundaries of such character as to cause the system of reflected waves to have a nodal point at the apex of said cone.

In testimony whereof, I have signed my name to this specification.

SAMUEL J. PLIMPTON.